(No Model.)
C. TOOMEY.
VEHICLE WHEEL.
No. 576,633. Patented Feb. 9, 1897.
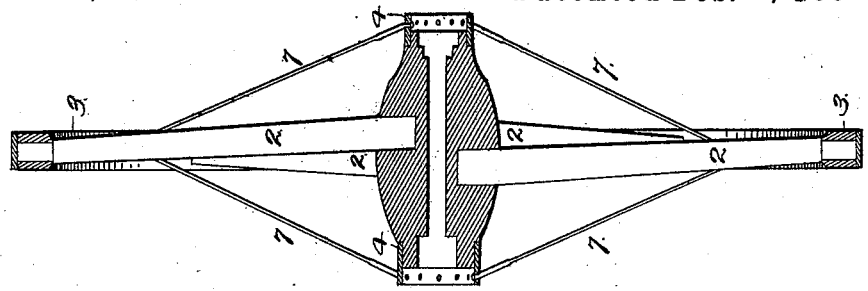
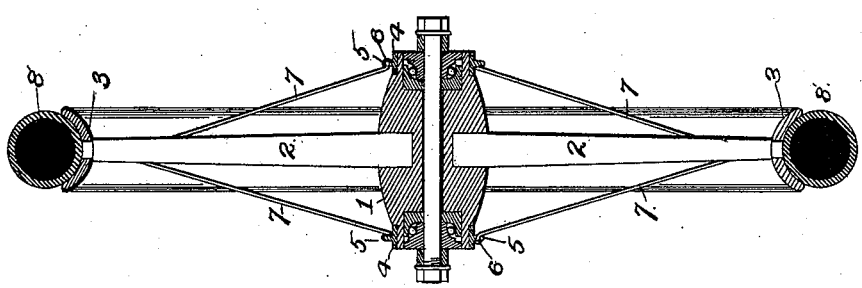
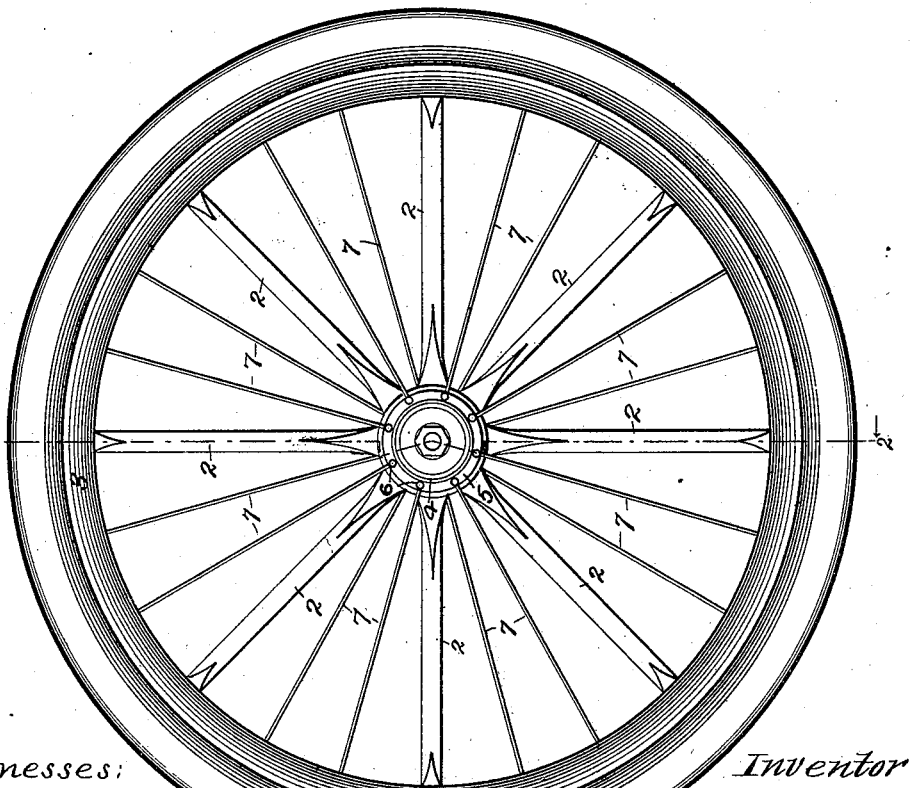
Witnesses:
F. G. Fischer
G. S. Thorpe
Inventor
Calvin Toomey,
By Hyman & Hyman
Attys.

UNITED STATES PATENT OFFICE.

CALVIN TOOMEY, OF KANSAS CITY, MISSOURI, ASSIGNOR TO C. TOOMEY & CO., OF SAME PLACE.

VEHICLE-WHEEL.

SPECIFICATION forming part of Letters Patent No. 576,633, dated February 9, 1897.

Application filed August 30, 1895. Serial No. 561,016. (No model.)

*To all whom it may concern:*

Be it known that I, CALVIN TOOMEY, of Kansas City, Jackson county, Missouri, have invented certain new and useful Improvements in Vehicle-Wheels, of which the following is a full, clear, and exact description, reference being had to the accompanying drawings, forming a part thereof.

My invention relates to vehicle-wheels, and more particularly to wheels for racing sulkies, bicycles, and other light vehicles. It is well known that in sulky-wheels, bicycle-wheels, &c., constructed entirely of wire spokes nearly all the strain comes upon that part of the wheel above the axle, while in ordinary wheels, or those provided with wood spokes alone, the strain mostly comes below the axle. In either case an absolutely rigid wheel is not produced.

My object is to equalize the strain and therefore produce an absolutely rigid wheel which will not yield in any direction and is stronger and more substantial than those composed entirely of wood or of steel spokes.

With this object in view the invention consists in certain novel and peculiar features of construction and organization, as will be hereinafter described and claimed.

In order that the invention may be fully understood, I will proceed to describe it with reference to the accompanying drawings, in which—

Figure 1 represents in side elevation a wheel embodying my invention. Fig. 2 represents a section of the same, taken on the line 2 2 of Fig. 1. Fig. 3 represents a vertical section of an ordinary buggy-wheel with my improvement applied thereto.

Similar reference-numerals designate corresponding parts in all of the figures.

In the said drawings, 1 designates the hub of the wheel, which may be of the configuration and construction shown or of any other suitable or preferred configuration.

2 designates a series of radial spokes of wood or equivalent material. Said spokes are mortised in the hub, as shown, or otherwise suitably secured at their inner ends, and at their outer ends are secured in any suitable manner to the rim 3, which may be in the form of a crescent in cross-section, as shown at Fig. 2, or may be the ordinary wood felly, as shown in Fig. 3. The spokes may occupy a single vertical plane or they may be staggered in the customary manner, as shown in Fig. 3.

4 designates cylindrical sleeves which are bolted, shrunk, or otherwise rigidly secured upon opposite ends of the hub at equal distances from its sector, and 5 designates annular flanges which project in a vertical plane from said sleeve 4 and are provided at suitable points with holes or apertures, as shown at 6.

7 designates inclined braces which preferably have their lower ends extending through and secured in the openings 6 and their outer ends secured in a single vertical plane centrally of and to the rim 3 or felly of the wheel. At their outer ends they may be secured to said rim by adjusting-nipples, like the ordinary bicycle-spokes, or may be secured in any other suitable or preferred manner. At their inner ends, also, they may be secured to flanges 5, as shown and described, or may be riveted to the sleeves 4, or may be extended entirely through said sleeves and tapped at their inner ends, if desired.

It is immaterial, so far as this invention is concerned, how the opposite ends of the braces are secured, the important feature of the invention being the employment of said inclined braces, with their outer ends fixed in the plane of the center of the wheel and their inner ends secured rigidly to the hub or a part thereof at equal distances from the center, in order that the braces may extend at equal angles with respect to the vertical plane of the wheel, and thereby brace the latter, with the assistance of the spokes 2, from yielding under any strain imposed short of a complete breakdown. It is to be understood, of course, that while I have shown a series of rigid wood spokes 2 the same result may be obtained by using in lieu of said spokes a single disk which will connect centrally the hub and the rim—in other words, employ a single spoke in place of many. If such a single spoke or disk were used, the wheel would be somewhat heavier and would not present as fine an appearance, but on the other hand these disadvantages would be counterbalanced by the fact that greater speed could probably be obtained, owing to the fact that the frictional resistance of the air would be diminished.

A pneumatic or cushioned tire 8 may be secured in the proper position upon the rim in the usual or any preferred manner.

In case I employ the inclined braces in connection with an ordinary buggy-wheel, it would be necessary to provide the sleeves 4 with holes or apertures to receive the inner ends of said braces, and it would be also necessary to secure their outer ends rigidly to the felly in a suitable manner. When thus provided with said braces, it is apparent that the buggy-wheel would possess all the advantages of my invention and would cost considerably less than a structure of the form shown in Fig. 2, owing to the fact that the only new parts employed would be the braces, and any ordinary mechanic skilled in the art to which said invention pertains could apply said braces to an ordinary wood-spoke wheel. Thus it will be seen that I have produced a wheel which is absolutely rigid and in which all of the strain is equalized. In other words, the weight upon the wheel is borne equally by the inclined braces above the axle, like the bicycle-wheel, and by the rigid wood spokes below the axle, like an ordinary buggy or wagon wheel. Therefore it is obvious that the rim cannot yield at any point, and therefore does not tend to loosen the spokes and shorten the life of the wheel, as in wheels of the ordinary construction. To repeat, the essence of the invention lies in the employment of a rigid connection between the hub and the rim, in combination with inclined braces. Said braces are preferably staggered alternately, like the ordinary bicycle-spokes, but may be arranged in any other suitable or preferred manner without departing from the spirit and scope or sacrificing any of the advantages of my invention.

Having thus described the invention, what I claim as new, and desire to secure by Letters Patent, is—

In a vehicle-wheel, the combination with a hub, perforated bands, secured upon the ends of the hub, and a concentrically-surrounding felly or rim provided with a tire, of rigid spokes connecting said felly or rim with the hub, and a series of wire spokes secured at their inner ends in the perforations of said bands, and converging outwardly and secured at their outer ends to the felly or rim of the wheel between said spokes, substantially as described.

In testimony whereof I affix my signature in presence of two witnesses.

CALVIN TOOMEY.

Witnesses:
G. Y. THORPE,
M. R. REMLEY.